(12) United States Patent
Tamai

(10) Patent No.: US 9,469,100 B2
(45) Date of Patent: Oct. 18, 2016

(54) PRINTING CONTROL DEVICE, PRINTING CONTROL METHOD, AND PRINTING CONTROL PROGRAM

(71) Applicant: SEIKO EPSON CORPORATION, Tokyo (JP)

(72) Inventor: Takashi Tamai, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/601,115

(22) Filed: Jan. 20, 2015

(65) Prior Publication Data

US 2015/0202862 A1   Jul. 23, 2015

(30) Foreign Application Priority Data

Jan. 23, 2014  (JP) ................ 2014-010284

(51) Int. Cl.
*B41J 2/045* (2006.01)
*B41J 2/21* (2006.01)
*H04N 1/405* (2006.01)

(52) U.S. Cl.
CPC ............ *B41J 2/0451* (2013.01); *B41J 2/2139* (2013.01); *H04N 1/4057* (2013.01)

(58) Field of Classification Search
CPC  B41J 2/2132; B41J 2/04593; B41J 2/04595; B41J 2/0451; G06K 15/102; H04N 1/40
See application file for complete search history.

(56) References Cited

U.S. PATENT DOCUMENTS

| | | | |
|---|---|---|---|
| 7,284,479 B2 | 10/2007 | Sato | |
| 7,407,264 B2 | 8/2008 | Kuwahara et al. | |
| 7,585,038 B2 | 9/2009 | Shibata et al. | |
| 2003/0179256 A1* | 9/2003 | Endo | B41J 2/04505 347/19 |
| 2005/0017999 A1* | 1/2005 | Yoshida | B41J 2/2107 347/6 |
| 2005/0253879 A1* | 11/2005 | Yamanobe | B41J 2/2132 347/5 |
| 2006/0274111 A1* | 12/2006 | Cho | B41J 2/0451 347/40 |
| 2007/0211101 A1* | 9/2007 | Yamanobe | B41J 2/04508 347/19 |
| 2009/0225121 A1* | 9/2009 | Miyamoto | B41J 2/2132 347/15 |
| 2013/0083107 A1* | 4/2013 | Nishikawa | B41J 2/0451 347/10 |
| 2013/0293611 A1* | 11/2013 | Ueshima | B41J 2/125 347/12 |

FOREIGN PATENT DOCUMENTS

| | | |
|---|---|---|
| JP | 2004-058284 A | 2/2004 |
| JP | 2004-058384 A | 2/2004 |
| JP | 2004-122521 A | 4/2004 |

* cited by examiner

Primary Examiner — Matthew Luu
Assistant Examiner — Patrick King
(74) Attorney, Agent, or Firm — Maschoff Brennan

(57) ABSTRACT

A printing control device includes a nozzle information obtainment unit that obtains the position of a discharge-failing nozzle which fails to discharge ink in a printing head which includes a plurality of nozzles discharging ink, a data generation unit that generates printing data in which a dot position which is the position of a dot constituting an image printed on a printing medium is associated with the amount of ink discharged to the dot position, and a data correction unit that specifies a second position which is adjacent to a first position where ink is discharged by the discharge-failing nozzle in the printing data on the basis of the position of the discharge-failing nozzle obtained and corrects the printing data so that the amount of ink which is greater than the amount of ink associated with the second position in the printing data generated is associated with the second position.

7 Claims, 15 Drawing Sheets

FIG. 10A

|   | 1 | 2 | 3 | 4 | 5 | 6 | 7 |
|---|---|---|---|---|---|---|---|
| 1 |   |   | SMALL |   |   |   |   |
| 2 | MEDIUM | LARGE |   | MEDIUM | LARGE |   | SMALL |
| 3 |   | LARGE |   | SMALL |   | MEDIUM |   |
| 4 | SMALL |   |   | SMALL |   | LARGE |   |
| 5 |   |   | LARGE |   | MEDIUM |   | SMALL |
| 6 |   | SMALL | SMALL |   | LARGE |   |   |
| 7 |   |   |   |   | SMALL | LARGE |   |
| 8 |   | LARGE |   | SMALL |   | MEDIUM |   |
| 9 | SMALL |   |   | MEDIUM |   | MEDIUM |   |

MAIN-SCANNING DIRECTION

SUB-SCANNING DIRECTION

FIG. 10B

|   | 1 | 2 | 3 | 4 | 5 | 6 | 7 |
|---|---|---|---|---|---|---|---|
| 1 |   |   | SMALL |   |   |   |   |
| 2 | MEDIUM | ×2 |   | LARGE | LARGE | SMALL | SMALL |
| 3 |   |   |   |   |   |   |   |
| 4 | SMALL | SMALL |   | MEDIUM |   | ×2 |   |
| 5 |   |   | ×2 |   | LARGE |   | SMALL |
| 6 |   | SMALL |   |   |   |   |   |
| 7 |   |   |   |   | MEDIUM | LARGE |   |
| 8 |   | LARGE |   | MEDIUM |   | LARGE |   |
| 9 | SMALL |   |   |   |   |   |   |

MAIN-SCANNING DIRECTION

SUB-SCANNING DIRECTION

| No. | MISSING PIXEL | BEFORE COMPLEMENTATION | AFTER COMPLEMENTATION |
|---|---|---|---|
| 1 | - | NONE | SMALL DOT |
| 2 | - | SMALL DOT | MEDIUM DOT |
| 3 | - | MEDIUM DOT | LARGE DOT |
| 4 | - | LARGE DOT | DOUBLE HIT |

| No. | MISSING PIXEL | BEFORE COMPLEMENTATION | AFTER COMPLEMENTATION |
|---|---|---|---|
| 1 | NONE | NONE | NONE |
| 2 | NONE | SMALL DOT | SMALL DOT |
| 3 | NONE | MEDIUM DOT | MEDIUM DOT |
| 4 | NONE | LARGE DOT | LARGE DOT |
| 5 | SMALL DOT | NONE | SMALL DOT |
| 6 | SMALL DOT | SMALL DOT | MEDIUM DOT |
| 7 | SMALL DOT | MEDIUM DOT | LARGE DOT |
| 8 | SMALL DOT | LARGE DOT | DOUBLE HIT |
| 9 | MEDIUM DOT | NONE | MEDIUM DOT |
| 10 | MEDIUM DOT | SMALL DOT | LARGE DOT |
| 11 | MEDIUM DOT | MEDIUM DOT | DOUBLE HIT |
| 12 | MEDIUM DOT | LARGE DOT | DOUBLE HIT |
| 13 | LARGE DOT | NONE | LARGE DOT |
| 14 | LARGE DOT | SMALL DOT | DOUBLE HIT |
| 15 | LARGE DOT | MEDIUM DOT | DOUBLE HIT |
| 16 | LARGE DOT | LARGE DOT | DOUBLE HIT |

| No. | MISSING PIXEL | BEFORE COMPLEMENTATION | AFTER COMPLEMENTATION |
|---|---|---|---|
| 1 | NONE | NONE | NONE |
| 2 | NONE | SMALL DOT | SMALL DOT |
| 3 | NONE | MEDIUM DOT | MEDIUM DOT |
| 4 | NONE | LARGE DOT | LARGE DOT |
| 5 | SMALL DOT | NONE | SMALL DOT |
| 6 | SMALL DOT | SMALL DOT | SMALL DOT + SMALL DOT |
| 7 | SMALL DOT | MEDIUM DOT | SMALL DOT + MEDIUM DOT |
| 8 | SMALL DOT | LARGE DOT | SMALL DOT + LARGE DOT |
| 9 | MEDIUM DOT | NONE | MEDIUM DOT |
| 10 | MEDIUM DOT | SMALL DOT | SMALL DOT + MEDIUM DOT |
| 11 | MEDIUM DOT | MEDIUM DOT | MEDIUM DOT + MEDIUM DOT |
| 12 | MEDIUM DOT | LARGE DOT | MEDIUM DOT + LARGE DOT |
| 13 | LARGE DOT | NONE | LARGE DOT |
| 14 | LARGE DOT | SMALL DOT | SMALL DOT + LARGE DOT |
| 15 | LARGE DOT | MEDIUM DOT | MEDIUM DOT + LARGE DOT |
| 16 | LARGE DOT | LARGE DOT | LARGE DOT + LARGE DOT | ns
PRINTING CONTROL DEVICE, PRINTING CONTROL METHOD, AND PRINTING CONTROL PROGRAM

CROSS-REFERENCE TO RELATED APPLICATIONS

This application claims priority to Japanese Patent Application No. 2014-010284 filed on Jan. 23, 2014. The entire disclosure of Japanese Patent Application No. 2014-010284 is hereby incorporated herein by reference.

BACKGROUND

1. Technical Field

The present invention relates to a printing control device, a printing control method, and a printing control program.

2. Related Art

An ink jet recording method and an ink jet recording apparatus are disclosed in JP-A-2004-58384. The ink jet recording method and the ink jet recording apparatus can record a high-definition image even when abnormality occurs in the discharge state of ink in a nozzle. When there is an abnormal nozzle (N) in which abnormality occurs in the discharge state of ink, recording data that corresponds to the abnormal nozzle (N) is added to recording data that corresponds to nozzles (N−1) and (N+1) which are positioned in the vicinity of the abnormal nozzle (N). This compensates for the recording data that corresponds to the abnormal nozzle (N).

The size of dots that the nozzles positioned in the vicinity of the abnormal nozzle are supposed to originally form is not considered in the invention described in JP-A-2004-58384. For this reason, a problem arises in that a blank caused by the abnormal nozzle cannot be complemented when the size of dots that the nozzles positioned in the vicinity of the abnormal nozzle are supposed to originally form is the greatest in the invention described in JP-A-2004-58384.

SUMMARY

An advantage of some aspects of the invention is to provide a printing control device, a printing control method, and a printing control program that can perform a complementation process independently of the size of dots around a blank when performing the complementation process of complementing the blank formed by a nozzle in which abnormality occurs in the discharge state of ink around the blank.

According to a first aspect of the invention, there is provided a printing control device including a nozzle information obtainment unit that obtains the position of a discharge-failing nozzle which fails to discharge ink in a printing head which includes a plurality of nozzles discharging ink on a printing medium, a data generation unit that generates printing data in which a dot position which is the position of a dot constituting an image printed on the printing medium is associated with the amount of ink discharged to the dot position, and a data correction unit that specifies a second position which is adjacent to a first position where ink is discharged by the discharge-failing nozzle in the printing data on the basis of the position of the discharge-failing nozzle obtained and corrects the printing data so that the amount of ink which is greater than the amount of ink associated with the second position in the printing data generated is associated with the second position.

In this case, the printing data in which the dot position which is the position of a dot constituting an image printed on the printing medium is associated with the amount of ink discharged to the dot position is generated. In addition, the position of the discharge-failing nozzle is obtained, the second position which is adjacent to the first position where ink is discharged by the discharge-failing nozzle is specified in the printing data on the basis of the position of the discharge-failing nozzle obtained, and the printing data is corrected so that the amount of ink which is greater than the amount of ink associated with the second position in the printing data generated is associated with the second position. Accordingly, a complementation process can be performed independently of the size of dots around a blank when the blank (first position) formed by the nozzle in which abnormality occurs in the discharge state of ink is complemented around the blank (second position) through the complementation process.

It is preferable that the data correction unit specify positions between which the first position is interposed along a transport direction of the printing medium as the second position. In this case, image quality after the complementation process can be increased.

It is preferable that the printing control device further include a storage unit in which a relationship between the size of a plurality of dots and the amount of ink discharged which corresponds to the size of each dot is stored, and the data correction unit associate multiple times of discharge of ink with the second position when the amount of ink discharged to the second position is greater than the amount of ink discharged that corresponds to the greatest size of a dot among the size of the plurality of dots stored in the storage unit. In this case, the amount of ink discharged can be increased even when the amount of ink discharged is not increased at once anymore.

It is preferable that a first amount, a second amount that is greater than the first amount, and a third amount that is greater than the second amount be stored in the storage unit as the amount of ink discharged, and the data correction unit correct the printing data so that the first amount is associated with the second position when the amount of ink associated with the second position in the printing data generated is none, the second amount is associated with the second position when the amount of ink associated with the second position in the printing data generated is the first amount, the third amount is associated with the second position when the amount of ink associated with the second position in the printing data generated is the second amount, and a fourth amount that is greater than the third amount and two times of discharge of ink are associated with the second position when the amount of ink associated with the second position in the printing data generated is the third amount. In this case, the amount of ink discharged that is associated with the second position can be appropriately increased on the basis of the amount of ink associated with the second position in the printing data generated.

It is preferable that the data correction unit do not correct the printing data generated when the amount of ink associated with the first position in the printing data generated is none and correct the printing data so that the sum of the amount of ink associated with the first position in the printing data generated and the amount of ink associated with the second position in the printing data generated is associated with the second position when discharge of ink is associated with the first position in the printing data generated. In this case, the amount of ink discharged that is associated with the second position can be appropriately increased on the basis of the amount of ink associated with the first position and the second position in the printing data generated.

It is preferable that a first amount, a second amount that is greater than the first amount, and a third amount that is greater than the second amount be stored in the storage unit as the amount of ink discharged, and the data correction unit correct the printing data so that the second amount is associated with the second position when the amount of ink associated with the second position in the printing data generated is the first amount, the third amount is associated with the second position when the amount of ink associated with the second position in the printing data generated is the second amount, and the fourth amount and two times of discharge of ink are associated with the second position when the amount of ink associated with the second position in the printing data generated is the third amount in a case where the amount of ink associated with the first position in the printing data generated is the first amount, associate the third amount with the second position when the amount of ink associated with the second position in the printing data generated is the first amount and associate the fourth amount and two times of discharge of ink with the second position when the amount of ink associated with the second position in the printing data generated is the second amount or the third amount in a case where the amount of ink associated with the first position in the printing data generated is the second amount, and associate the fourth amount and two times of discharge of ink with the second position when the amount of ink associated with the second position in the printing data generated is the first amount, the second amount, or the third amount in a case where the amount of ink associated with the first position in the printing data generated is the third amount. In this case, the amount of ink discharged that is associated with the second position can be appropriately increased on the basis of the amount of ink associated with the first position and the second position in the printing data generated.

It is preferable that the data correction unit correct the printing data so that ink is discharged multiple times to the second position. In this case, a great amount of ink can be discharged to the second position.

According to a second aspect of the invention, there is provided a printing control method including generating printing data in which a dot position which is the position of a dot constituting an image printed on a printing medium is associated with the amount of ink discharged to the dot position, and specifying a second position that is adjacent to a first position where ink is discharged by a discharge-failing nozzle in the printing data on the basis of the position of the discharge-failing nozzle that fails to discharge ink in a printing head which includes a plurality of nozzles discharging ink to the printing medium and correcting the printing data so that the amount of ink which is greater than the amount of ink associated with the second position in the printing data generated is associated with the second position. In this case, the complementation process can be performed independently of the size of dots around the blank when the blank (first position) formed by the nozzle in which abnormality occurs in the discharge state of ink is complemented around the blank (second position) through the complementation process.

According to a third aspect of the invention, there is provided a printing control program that causes a computer to function as a printing control device and to execute generating printing data in which a dot position which is the position of a dot constituting an image printed on a printing medium is associated with the amount of ink discharged to the dot position, and specifying a second position that is adjacent to a first position where ink is discharged by a discharge-failing nozzle in the printing data on the basis of the position of the discharge-failing nozzle that fails to discharge ink in a printing head which includes a plurality of nozzles discharging ink to the printing medium and correcting the printing data so that the amount of ink which is greater than the amount of ink associated with the second position in the printing data generated is associated with the second position. In this case, the complementation process can be performed independently of the size of dots around the blank when the blank (first position) formed by the nozzle in which abnormality occurs in the discharge state of ink is complemented around the blank (second position) through the complementation process.

BRIEF DESCRIPTION OF THE DRAWINGS

The invention will be described with reference to the accompanying drawings, wherein like numbers reference like elements.

FIG. 10A is raster graphic data before correction, and FIG. 10B is raster graphic data after correction.

FIG. 11 is a diagram illustrating an example of a complementation table.

FIG. 15 is a diagram illustrating an example of a complementation table.

FIG. 16 is a diagram illustrating an example of a complementation table.

DESCRIPTION OF EXEMPLARY EMBODIMENTS

Embodiments of the invention will be described with reference to the accompanying drawings.

First Embodiment

Figure 1:
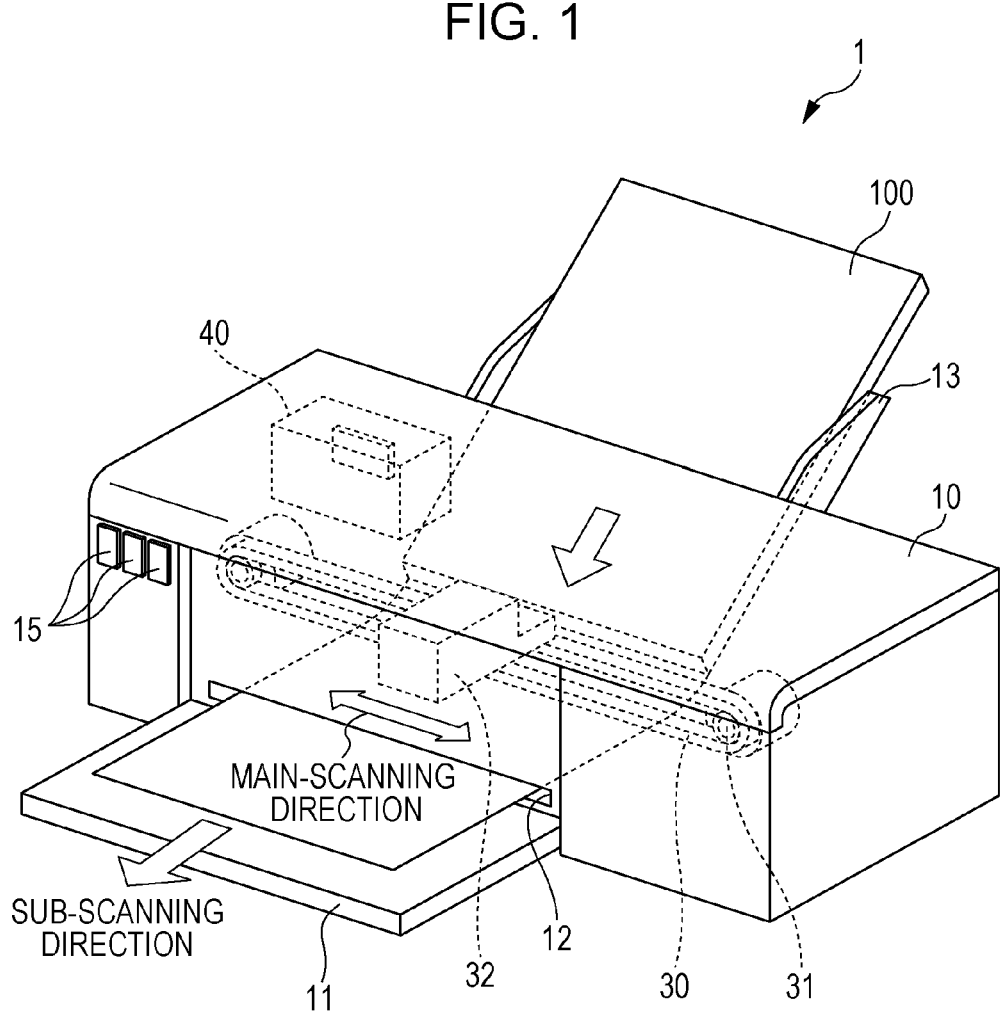
FIG. 1 is a diagram illustrating an example of the configuration of a printing apparatus 1 in a first embodiment.

FIG. 1 is a diagram illustrating an example of the configuration of a printing apparatus 1 in an embodiment of the invention. The printing apparatus 1 in a first embodiment is a so-called ink jet printer that prints an image by ejecting ink to an outer surface of a printing medium 100.

A casing 10 is shaped as an exterior of a box, and a front cover 11 is disposed at a substantially center of the front surface of the casing 10. A plurality of operation buttons 15 is disposed near the front cover 11. The front cover 11 is axially supported on the lower end side thereof. An elongated discharge port 12 where the printing medium 100 is discharged appears when the upper end side of the front cover 11 is pulled forward.

A sheet feed tray 13 is disposed on the rear surface side of the casing 10. When the printing medium 100 is set in the sheet feed tray 13, and the operation button 15, a personal computer (PC), or the like is operated to perform a printing instruction, the printing medium 100 is fed from the sheet feed tray 13. The printing medium 100 is discharged from the discharge port 12 after an image is printed on the outer surface of the printing medium 100 inside the casing 10.

Mainly, a control unit 40 is disposed inside the casing 10. The control unit 40 controls the entire printing apparatus 1 by executing firmware. The control unit 40 will be described in detail below. Meanwhile, the control unit 40 does not need to be disposed inside the casing 10. The control unit 40, for example, may be provided in an apparatus such as a PC that is connected to the printing apparatus 1. When the control unit 40 is provided in an apparatus such as a PC, the control unit 40 may control the entire printing apparatus 1 by executing a printer driver.

Figure 2:
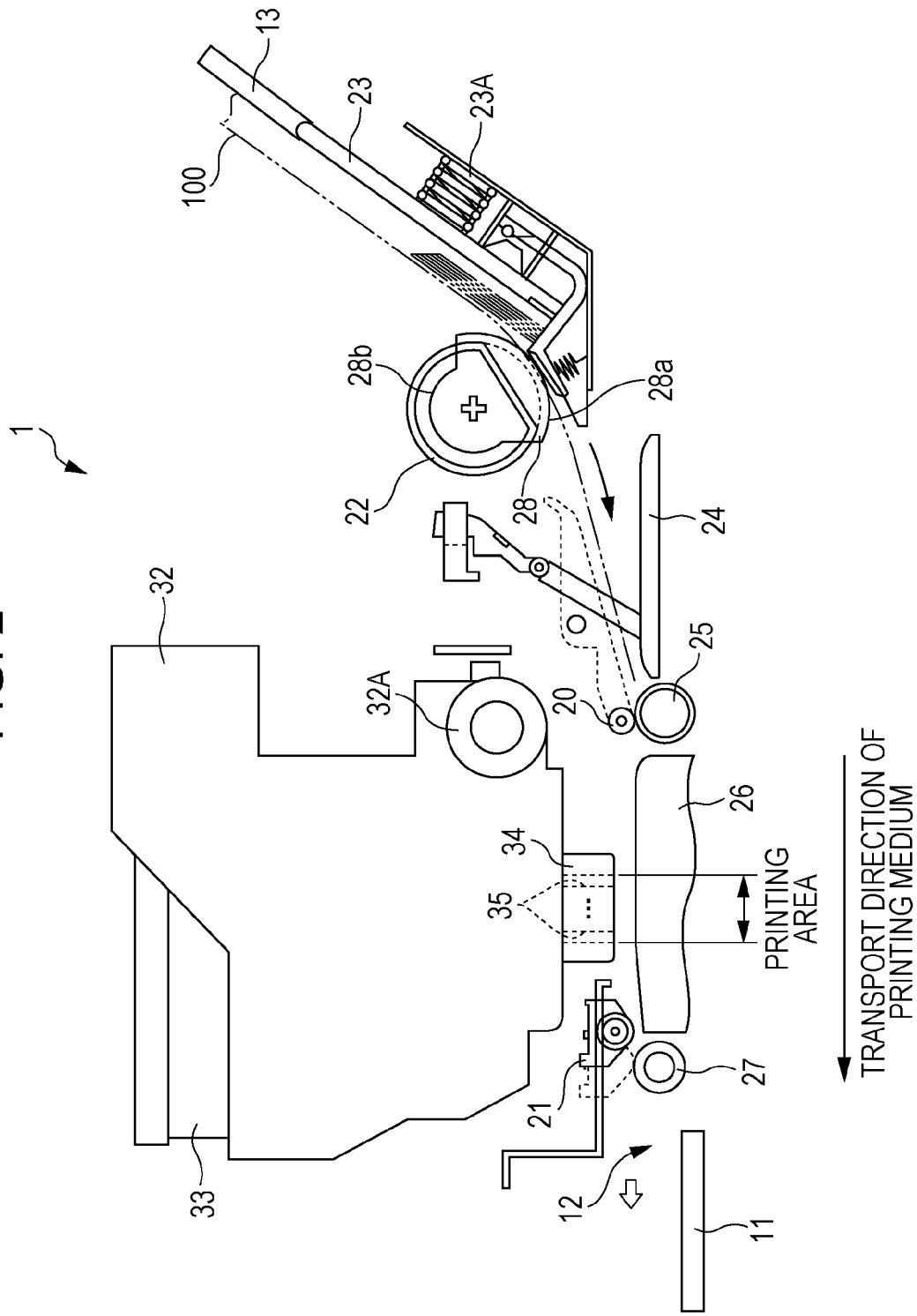
FIG. 2 is a diagram illustrating an example of the configuration of a transport mechanism and an ink discharge mechanism of the printing apparatus.

The printing apparatus 1 includes a transport mechanism that transports the printing medium 100 mounted in the sheet feed tray 13 to the discharge port 12 and an ink discharge mechanism that discharges ink to a printing medium such as the printing medium 100 transported by the transport mechanism. FIG. 2 is a diagram illustrating an example of the configuration of the transport mechanism and the ink discharge mechanism.

The transport mechanism includes an LD roller 22 as a first sheet feed roller, a hopper 23 as a nipping member, a sheet guide 24, a PF roller 25 as a second sheet feed roller, a platen 26, a sheet discharge roller 27, and the like.

The hopper 23 is biased toward the LD roller 22 by the force of a hopper spring 23A. Accordingly, a convex portion formed in a lower end portion of the hopper 23 fits a concave portion of a gapping cam 28 when the printing apparatus 1 is stopped.

The lower end edge of the hopper 23 is separated from the concave portion of the gapping cam 28 and abuts a large diameter portion 28a of the gapping cam 28 when the LD roller 22 rotates counterclockwise in FIG. 2. The lower end edge of the hopper 23 is separated from the large diameter portion 28a of the gapping cam 28 and abuts a small diameter portion 28b of the gapping cam 28 when the LD roller 22 further rotates counterclockwise in FIG. 2. Consequently, the printing medium 100 is nipped by the LD roller 22 and the hopper 23.

When the LD roller 22 further rotates counterclockwise in FIG. 2, the printing medium 100 is transported in a lower left direction (refer to the arrow) in FIG. 2 in response to the rotation of the LD roller 22 and is supplied to a printing area (will be described in detail below) by the sheet guide 24, the PF roller 25, and the like. The printing medium 100 is discharged by the sheet discharge roller 27 after printing.

The ink discharge mechanism is arranged on the upper side (upper side in FIG. 2) of the transport mechanism that has the above configuration. The ink discharge mechanism mainly includes a carriage 32, an ink tank 33, a printing head 34, and the like.

The carriage 32 is positioned over the platen 26. The carriage 32 is connected to a drive unit that includes a timing belt 30 (refer to FIG. 1) inside which a plurality of teeth shapes are formed and a drive motor 31 (refer to FIG. 1) which drives the timing belt 30. The carriage 32 moves in the axial direction (main-scanning direction) of a carriage shaft 32A when the timing belt 30 is driven.

The printing head 34 that includes a plurality of nozzle arrays 35 is arranged on the lower surface of the carriage 32.

Figure 3:
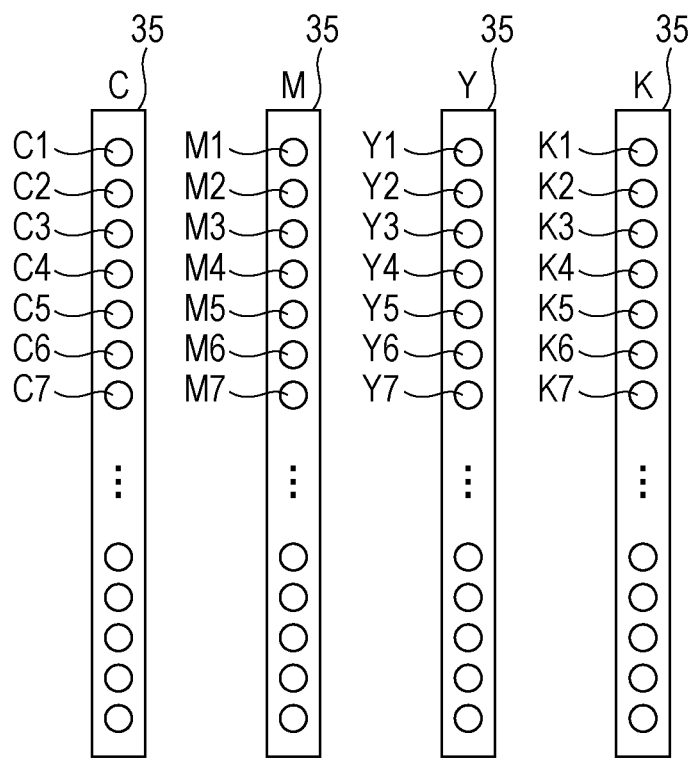
FIG. 3 is a diagram illustrating an example of the configuration of a nozzle array.

FIG. 3 is a diagram illustrating the nozzle array 35 included in the printing head 34 in detail. FIG. 3 is a diagram in which nozzles of the printing head 34 are viewed from the top (top in FIG. 2) in a see-through manner.

The nozzle array 35 is disposed for each ink color (CMYK). A plurality of nozzles (for example, C1, C2, . . . for C color) is disposed to be lined up along a sub-scanning direction (transport direction of the printing medium 100) in the nozzle array 35. Here, the nozzle is a discharge outlet for discharging ink. The number of nozzles included in the nozzle array 35 is arbitrary. The four nozzle arrays 35 move as a whole in the main-scanning direction along with the movement of the carriage 32.

The ink tank 33 is arranged in the carriage 32. Ink accommodated in the ink tank 33 is supplied to each nozzle included in the nozzle array 35. A piezoelectric element that is deformed by a voltage applied thereto is arranged in each nozzle. Ink is discharged from each nozzle when the piezoelectric element is deformed.

An area in which ink is discharged to the printing medium 100 by the printing head 34 is the printing area.

Figure 4:
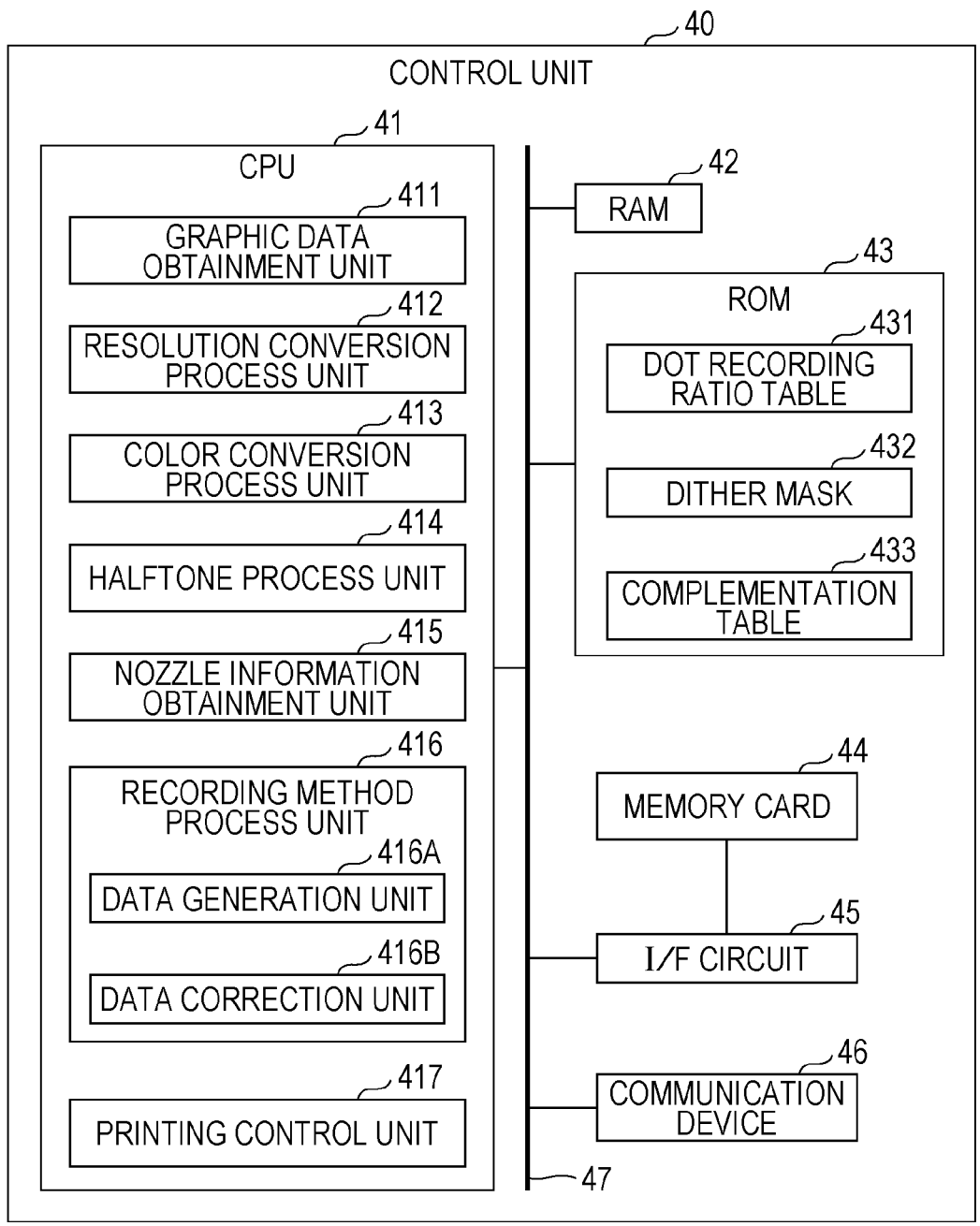
FIG. 4 is a block diagram schematically illustrating the outline configuration of a control unit.

FIG. 4 is a block diagram schematically illustrating the outline configuration of the control unit 40.

The control unit 40 mainly includes a CPU 41 that is a computing device, a RAM 42 that is a volatile storage device, a ROM 43 that is a non-volatile storage device, a memory card 44, an interface (I/F) circuit 45 that connects the control unit 40 and other units (for example, the memory card 44), a communication device 46 that communicates with devices outside the printing apparatus 1 (for example, a digital camera and the like), and a bus 47 that connects all of these together.

The CPU 41 mainly includes functional units such as a graphic data obtainment unit 411, a resolution conversion process unit 412, a color conversion process unit 413, a halftone process unit 414, a nozzle information obtainment unit 415, a recording method process unit 416, and a printing control unit 417.

Various data such as a dot recording ratio table 431 and a dither mask 432 that are used in the halftone process unit 414 and a complementation table 433 that is used in the recording method process unit 416 is stored in the ROM 43. The dot recording ratio table 431 and the complementation table 433 will be described in detail below. In addition, a predetermined program is stored in the ROM 43.

Each functional unit included in the CPU 41, for example, can be realized by reading the predetermined program stored in the ROM 43 into the RAM 42 and executing the program. The predetermined program, for example, may be installed in advance in the ROM 43 or may be installed or updated by being downloaded from a network through the communication device 46.

Next, each functional unit included in the CPU 41 will be described.

The graphic data obtainment unit 411 obtains graphic data of a printing target. The graphic data may be stored in the memory card 44 or may be obtained from a network through the communication device 46.

The resolution conversion process unit 412 performs a resolution conversion process on the obtained graphic data. Here, the resolution conversion process is a process of converting the graphic data (text data, image data, and the like) into graphic data having a resolution when printed on the printing medium 100 (printing resolution). For example, when the printing resolution is specified to be 720×720 dpi, the vector graphic data obtained is converted into bitmap graphic data having a resolution of 720×720 dpi. Each pixel data of the graphic data after the resolution conversion process is configured by each gradation (for example, 256 gradations) data represented by an RGB color space.

The color conversion process unit 413 performs a color conversion process of converting the graphic data in accordance with color space of the color of ink. Here, the graphic data of the RGB color space is converted into graphic data of a KCMY color space. The color conversion process is performed on the basis of a color conversion table LUT (not illustrated) in which a gradation value of RGB data is associated with a gradation value of KCMY data. The graphic data of the KCMY color space is obtained through this color conversion process. The pixel data after the color conversion process is 8-bit data with 256 gradations represented by the KCMY color space.

The halftone process unit 414 performs a halftone process of converting the data after the color conversion into data having a small number of gradations that the printing apparatus 1 can form. The halftone process is a process of decreasing the gradation value of the original graphic data (256 gradations in the present embodiment) to a gradation value that the printing apparatus 1 can represent for each pixel. The halftone process unit 414 decreases the gradations of the 256-gradation data obtained from the color conversion process unit 413 to four gradations of "not forming a dot", "forming a small dot", "forming a medium dot", and "forming a large dot". Meanwhile, regarding the mass of ink, a small dot has a mass of 4 ng, a medium dot has a mass of 8 ng, and a large dot has a mass of 12 ng in the present embodiment, and this information is stored in the ROM 43.

The halftone process unit 414 performs the halftone process using a dithering method in the present embodiment. However, a method for the halftone process is not limited to the dithering method. For example, an error diffusion method or the like can be also used.

The data after the halftone process becomes data that indicates the formation status of a dot (presence or absence of a dot and the size of a dot) in each pixel (hereinafter, referred to as dot data). The process performed by the halftone process unit 414 will be described in detail below.

The nozzle information obtainment unit 415 obtains the position of a nozzle that fails to discharge ink (hereinafter, referred to as a discharge-failing nozzle) such as one that cannot discharge ink and one of which the accuracy of discharge of ink is low. The position of a discharge-failing nozzle may be input by a user via an unillustrated input device or may be detected by using a sensor. General technologies can be used for a method for detecting a discharge-failing nozzle using a sensor. Thus, the method will not be described herein. The nozzle information obtainment unit 415 obtains the position of a discharge-failing nozzle that is input or detected.

The recording method process unit 416 includes a data generation unit 416A and a data correction unit 416B. The data generation unit 416A performs a rasterizing process to generate printing data. The rasterizing process is a process of sorting each pixel data which constitutes the graphic data so that each pixel data is assigned to the responsible nozzle thereof. The data correction unit 416B corrects the generated printing data on the basis of the position of a discharge-failing nozzle obtained by the nozzle information obtainment unit 415. The process performed by the recording method process unit 416 will be described in detail below.

The printing control unit 417 performs a printing operation according to the printing data. Specifically, the printing control unit 417 prints an image by controlling the transport mechanism according to the printing data and controlling the ink discharge mechanism to discharge color ink from the nozzle. A process performed by the printing control unit 417 is general and thus, will not be described in detail.

The above-described configuration of the printing apparatus 1 is a description of main constituents for describing features of the first embodiment and thus, does not limit the configuration of the printing apparatus 1. In addition, the configuration of a general printing apparatus is not excluded as the configuration of the printing apparatus 1.

Next, a featured process of the printing apparatus 1 in the first embodiment will be described.

Figure 5:
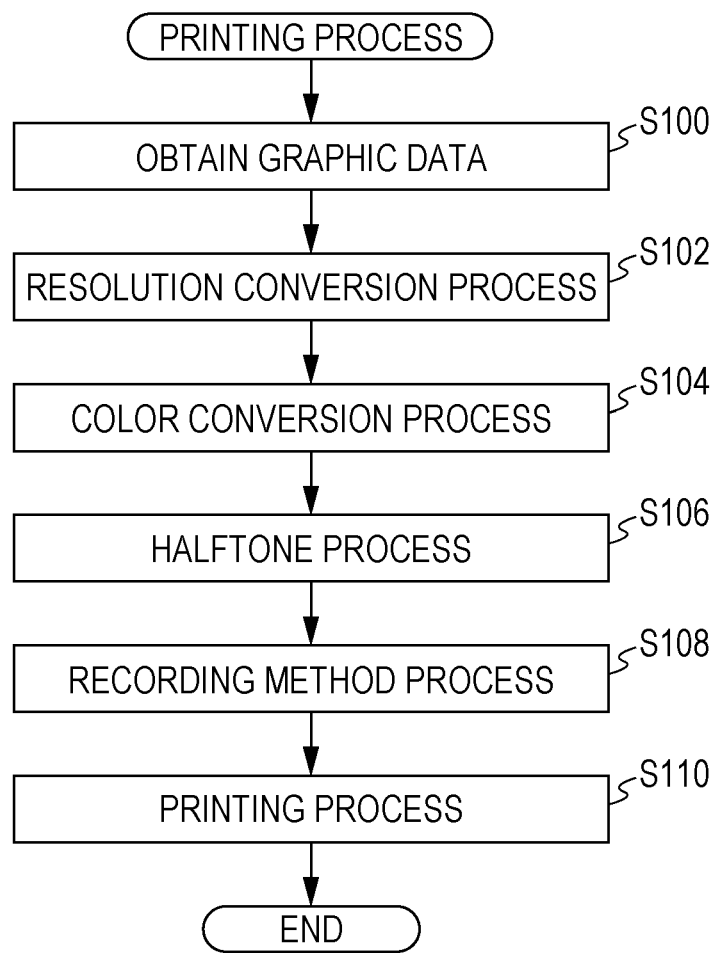
FIG. 5 is a flowchart illustrating a flow of a printing process performed by the printing apparatus.

FIG. 5 is a flowchart illustrating a flow of a printing process performed by the printing apparatus 1. This process is performed by inputting a printing start instruction via the operation button 15 or the like.

When the printing process is started, the graphic data obtainment unit 411 obtains the graphic data from the memory card 44 and the like (step S100). The resolution conversion process unit 412 converts the resolution of the graphic data obtained in step S100 into the printing resolution (step S102). The color conversion process unit 413 converts the graphic data of the RGB color space of which the resolution is converted in step S102 into graphic data of the KCMY color space (step S104).

The halftone process unit 414 performs the halftone process on the multilevel gradation data converted in color in step S104 (step S106). Hereinafter, the halftone process (step S106) will be specifically described. The halftone process unit 414 performs the halftone process using the dot recording ratio table 431.

Figure 6:
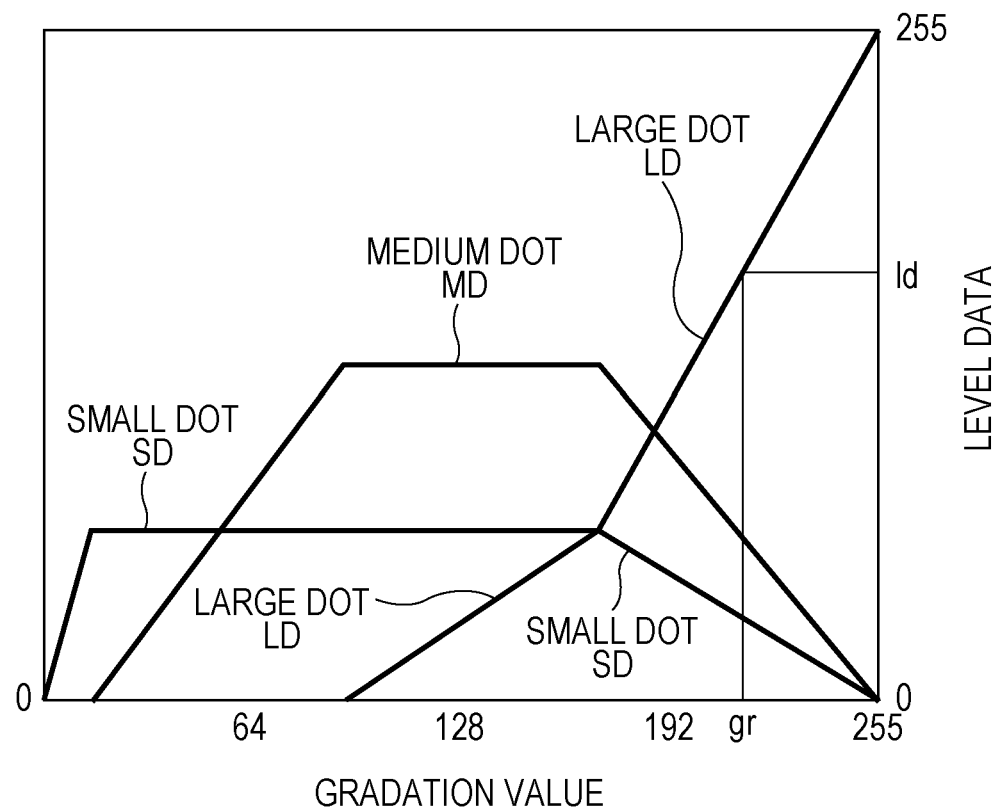
FIG. 6 is a diagram illustrating a plurality of dot recording ratio tables used in determining level data for each of large, medium, and small dots.

FIG. 6 is a diagram illustrating a plurality of dot recording ratio tables used in determining level data for each of large, medium, and small dots. In FIG. 6, the horizontal axis indicates the gradation value (0 to 255), and the vertical axis indicates the level data (0 to 255). In FIG. 6, a profile SD indicates the recording ratio of a small dot, a profile MD indicates the recording ratio of a medium dot, and a profile LD indicates the recording ratio of a large dot. The level data is data obtained by converting a recording ratio of a dot that means a proportion of pixels where dots are formed among pixels in an area when the area is uniformly reproduced according to a certain gradation value into 256 levels of a value from 0 to 255. The dot recording ratio table 431 is formed by storing the profile LD in the ROM 43 (corresponding to a storage unit in the invention) as a one-dimensional table. The dot recording ratio table 431 includes level data of a large dot, level data of a medium dot, and level data of a small dot.

First, the halftone process unit 414 reads level data LVL in accordance with a gradation value from the profile LD for a large dot on the basis of the dot recording ratio table 431.

For example, when the gradation value of the multilevel gradation data is gr, ld is obtained as the level data LVL by using the profile LD as illustrated in FIG. 6.

Then, the halftone process unit 414 determines whether the obtained level data LVL is greater than a threshold THL. The threshold THL is a so-called dither matrix and is differently set for each pixel. For example, a matrix of which values from 0 to 254 appear in a 16×16 square pixel block is used as the threshold THL. Specifically, the halftone process unit 414 compares the magnitudes of each pixel of the level data LVL and the corresponding place thereof in a dither table. A dot is ON when the level data LVL is greater than the threshold THL indicated in the dither table. A dot is OFF when the level data LVL is smaller than the threshold THL.

Next, when the level data LVL is smaller than the threshold THL, the halftone process unit 414 determines that a large dot is not to be formed and sets level data LVM for a medium dot on the basis of the dot recording ratio table 431 like in the case of the level data LVL for a large dot. Then, the halftone process unit 414 compares the level data LVM for a medium dot with a threshold THM in the dither matrix and determines whether the level data LVM is greater than the threshold THM. The halftone process unit 414 determines that a medium dot is to be ON when the level data LVM for a medium dot is greater than the threshold THM.

Furthermore, when the level data LVM for a medium dot is smaller than the threshold THM, the halftone process unit 414 determines that a medium dot is not to be formed and sets level data LVS for a small dot on the basis of the dot recording ratio table 431 like in the case of setting the level data for a large dot and a medium dot. The halftone process unit 414 determines that a small dot is to be ON when the level data LVS is greater than a threshold THS in the dither matrix.

To suppress decrease in the recording ratio of a medium dot and a small dot, it is preferable that each of the dither matrices for a medium dot and a small dot differ from the dither matrix for a large dot.

The halftone process unit 414 determines that a dot is not to be formed when the level data LVS for a small dot is smaller than the threshold THS.

The halftone process unit 414 associates the determination result obtained in the above manner with the position of the multilevel data which is the basis of the determination.

Figure 7:
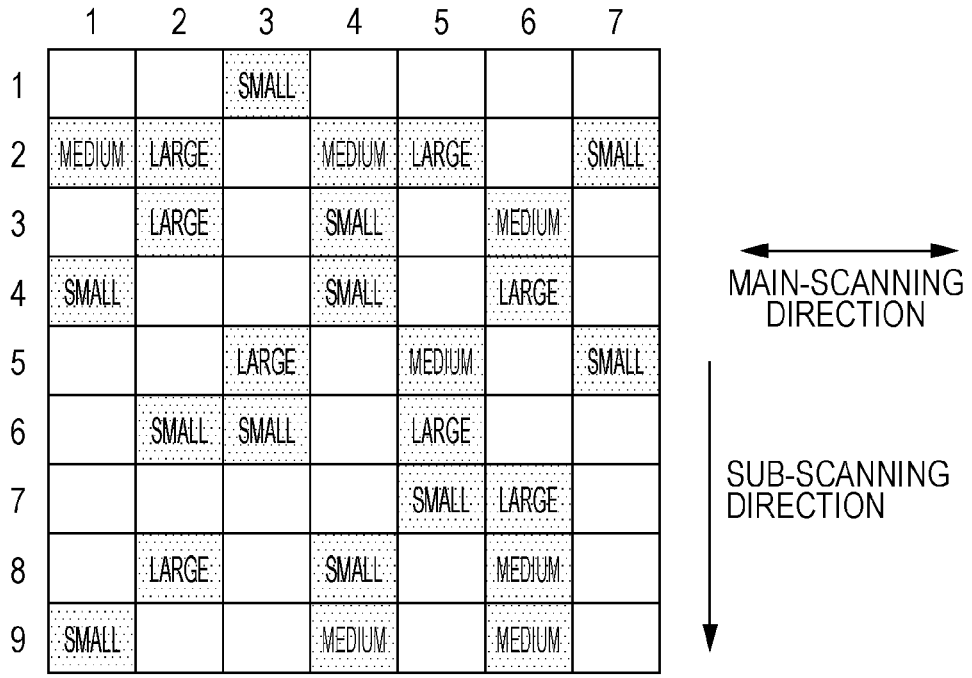
FIG. 7 is a diagram illustrating dot data after a halftone process.

The halftone process unit 414 repeats the above process for all of the pixels to generate the dot data. FIG. 7 is an example of the dot data that is generated by the halftone process unit 414. Hatched boxes in FIG. 7 mean places where dots are formed. In addition, "large", "medium", and "small" displayed in each box mean the size of a dot (means the same as the amount of discharged ink through the specification hereinafter).

Seven horizontal and nine vertical boxes for a total of 63 boxes are illustrated in FIG. 7. Hereinafter, the position of the box in FIG. 7 will be referred to as a dot position. In addition, the position of the box in FIG. 7 when an image is printed on the printing medium 100, that is, the position of dots that constitute an image printed on the printing medium 100 will be referred to as the dot position. In the present embodiment, an interval between adjacent dot positions in the main-scanning direction is the same as an interval between adjacent dot positions in the sub-scanning direction.

FIG. 5 is referred to again for description here. The recording method process unit 416 performs a recording method process (step S108). The recording method process in the present embodiment is a process of generating the printing data on the basis of the graphic data and then correcting the printing data on the basis of the position of a discharge-failing nozzle obtained by the nozzle information obtainment unit 415. Hereinafter, step S108 will be described in detail.

Figure 8:
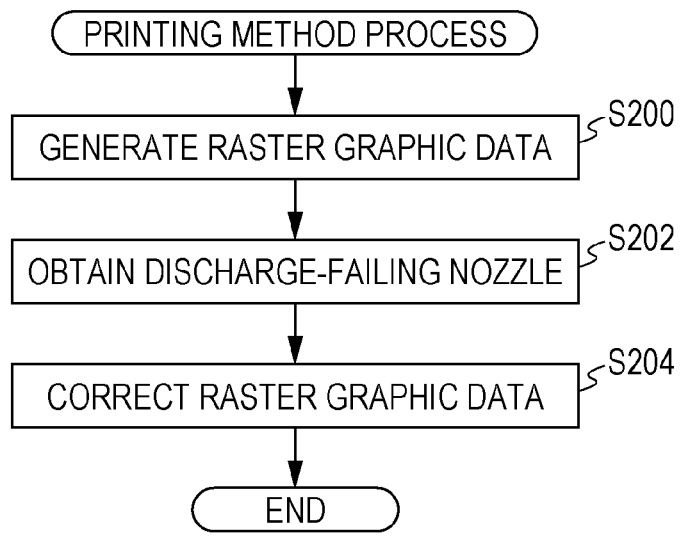
FIG. 8 is a flowchart illustrating a flow of a recording method process performed by the printing apparatus.

FIG. 8 is a flowchart illustrating a flow of the recording method process (step S108).

The data generation unit 416A determines which nozzle discharges ink to form a dot on the printing medium for each dot in the dot data after the halftone process and generates raster graphic data (step S200). Hereinafter, this process will be described with reference to FIGS. 9A and 9B.

Figures 9A, 9B:
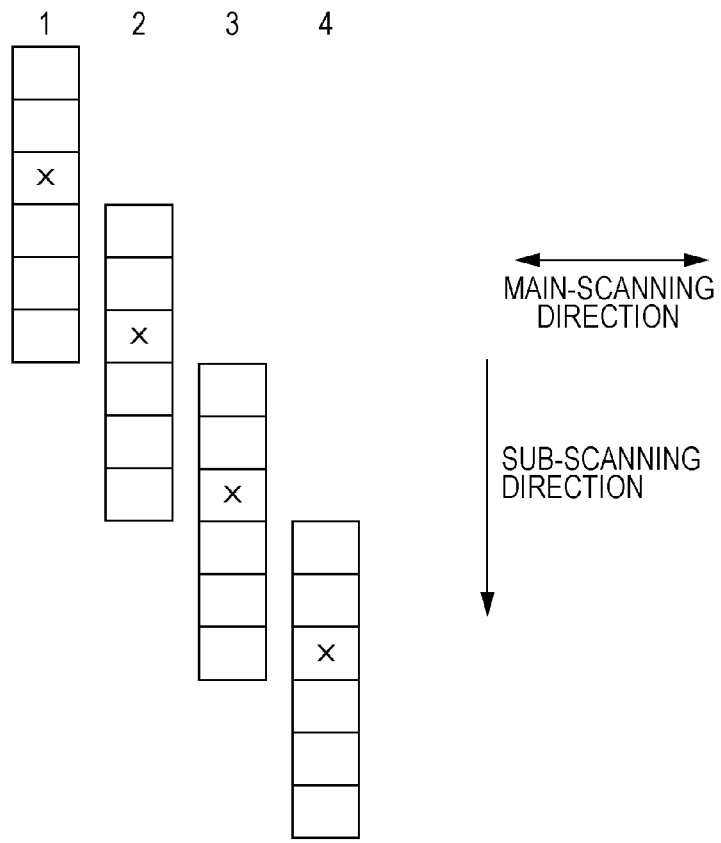
FIG. 9A is a diagram illustrating the position of a nozzle in the nozzle array.
FIG. 9B is a diagram illustrating which nozzle discharges ink to each dot position in the dot data.

FIG. 9A is a diagram illustrating the position of nozzles in the nozzle array 35. The nozzle array 35 includes six nozzles in the present embodiment. In FIG. 9A, a nozzle displayed with a x mark means a discharge-failing nozzle. A number displayed over each nozzle array indicates the order of scanning.

In the present embodiment, printing is performed by adopting a printing method of forming one raster in a plurality of different passes (hereinafter, referred to as overlap printing (OL printing)). In the OL printing, one raster is formed by using a plurality of different nozzles. Specifically, a nozzle is used to intermittently form dots for every few dots, and another nozzle is used to form dots so as to fill the space between dots that are already formed in another pass, thus forming one raster. "Overlap number M" is defined to be the number of passes when one raster is formed through M passes in the above manner.

Which nozzle discharges ink for each pixel data that constitutes the graphic data is different depending on the overlap number M, the amount of transport of the printing medium 100 in the sub-scanning direction, and the like. Accordingly, the recording method process unit 416 obtains these pieces of information (for example, stored in the ROM 43) and generates data in which each dot position that constitutes a raster is associated with a nozzle that forms a dot at the dot position as illustrated in FIG. 9A on the basis of the obtained information.

The OL printing is performed with the overlap number M=4 in the present embodiment. First, the printing head 34 performs the first scan by scanning the printing medium 100 rightward in the main-scanning direction (rightward in FIG. 9A). Next, the printing medium 100 is transported in the sub-scanning direction by a distance corresponding to three nozzles, and the printing head 34 performs the second scan by scanning the printing medium 100 leftward in the main-scanning direction (leftward in FIG. 9A).

For the third scan and the fourth scan, the printing medium 100 is transported in the sub-scanning direction by the distance corresponding to three nozzles, and then the printing head 34 scans the printing medium 100 rightward or leftward in the main-scanning direction like in the second scan.

Bidirectional printing is performed even in a second embodiment like in the first embodiment. The 2n+1-th scan (where n is an integer greater than or equal to 0, that is, an odd-numbered-th scan) is performed rightward in the main-scanning direction, and the 2n-th scan (where n is an integer greater than or equal to one, that is, an even-numbered-th scan) is performed leftward in the main-scanning direction.

The fifth to the eighth scans, the ninth to the twelfth scans, . . . are the same as the first to the fourth scans and thus will not be described.

Although the printing head 34 is described as moving relatively with respect to the printing medium 100 in FIG.

9A for description purposes, the printing medium 100 actually moves in the sub-scanning direction. In addition, the printing apparatus 1 in the present embodiment performs the printing process through bidirectional printing of moving in one direction and the reverse direction. Furthermore, the present embodiment can be also applied to unidirectional printing. Here, performing one scan (moving in one direction or the reverse direction) by using the nozzle array 35 is referred to as a pass.

FIG. 9B is a diagram illustrating which nozzle discharges ink to each dot position in the dot data. The dot position and a nozzle that forms a dot at the dot position are associated with each other in FIG. 9B.

The data generation unit 416A assigns a plurality of dot positions in one raster to two passes. A number displayed in each box in FIG. 9B indicates in which pass a dot is formed. In FIG. 9B, the fourth to the sixth nozzles are assigned to the odd-numbered-th columns in the first to the third rows in the first scan (first pass). The first to the sixth nozzles are assigned to the even-numbered-th columns in the first to the sixth rows in the second scan (second pass). The first to the sixth nozzles are assigned to the odd-numbered-th columns in the fourth to the ninth rows in the third scan (third pass). The first to the third nozzles are assigned to the even-numbered-th columns in the seventh to the ninth rows in the fourth scan (fourth pass). In addition, a box with the x mark is the dot position to which a discharge-failing nozzle is assigned in FIG. 9B.

The data generation unit 416A generates the raster graphic data (corresponding to the printing data in the invention) on the basis of the result illustrated in FIG. 9B and the dot data after the halftone process (will be described in detail below (refer to FIG. 10A)). Although the position of the discharge-failing nozzles is already known in FIG. 9B and in the description related to FIG. 9B for description purposes, in actuality, the position of the discharge-failing nozzles is not determined in the current stage, and discharge-failing nozzles are not assigned.

FIG. 8 is referred to again for description here. After the raster graphic data is generated in the above manner (step S200), the data correction unit 416B obtains the position of the discharge-failing nozzles from the nozzle information obtainment unit 415 (step S202). The printer driver obtains the position of the discharge-failing nozzles that the printing apparatus 1 obtains in step S202 when the control unit 40 is provided as the printer driver that is installed on an apparatus (a PC or the like) connected to the printing apparatus 1. Meanwhile, the order of step S200 and step S202 may be inverted.

Then, based on the position of the discharge-failing nozzles obtained in step S202, the data correction unit 416B corrects the raster graphic data generated in step S200 in such a manner that the amount of ink discharged to the position (corresponding to a second position in the invention and will be referred to as a complementation position) that is adjacent to the dot position (corresponding to a first position in the invention and will be referred to as a discharge failure position hereinafter) where a discharge-failing nozzle forms a dot in the raster graphic data generated in step S200 is increased (step S204). In the present embodiment, positions that are adjacent to the discharge failure position along the transport direction of the printing medium 100 (sub-scanning direction) or positions that are adjacent to the discharge failure position along the main-scanning direction are the complementation position since the dot positions are shaped as a lattice. Hereinafter, this process will be described with reference to FIGS. 10A and 10B.

FIG. 10A is a diagram illustrating the relationship between the dot position and the size of a dot in the raster graphic data before correction (generated in step S200), and FIG. 10B is a diagram illustrating the relationship between the dot position and the size of a dot after correction.

First, the data correction unit 416B specifies the discharge failure position in the raster graphic data generated in step S200. The discharge failure position is a position hatched with inclined lines in FIG. 10A. The data correction unit 416B corrects the raster graphic data so that the amount of ink discharged to the discharge failure position is "none".

Next, the data correction unit 416B specifies the complementation position. In the present embodiment, the data correction unit 416B specifies positions between which the discharge failure position is interposed along the transport direction (sub-scanning direction) as the complementation position. The complementation position is boxes up and down of the position hatched with inclined lines and is displayed as a double-lined box in FIG. 10A.

Although the positions between which the discharge failure position is interposed along the scanning direction are the complementation position in the present embodiment, the complementation position is not limited to these provided that the complementation position is the positions that are adjacent to the discharge failure position along the transport direction of the printing medium 100 (sub-scanning direction) or positions that are adjacent to the first position along the scanning direction (will be described in detail below).

Then, the data correction unit 416B determines the amount of ink discharged to the complementation position using the complementation table 433A (refer to FIG. 11). In FIG. 11, the column of "missing pixel" indicates the amount of ink discharged to the discharge failure position in the raster graphic data generated in step S200. The column of "before complementation" indicates the amount of ink discharged to the complementation position in the raster graphic data generated in step S200. The column of "after complementation" indicates the amount of ink discharged to the complementation position after correction in the present step (step S204). The amount of ink discharged to the discharge failure position is not considered in the present embodiment.

As illustrated in FIG. 11, the data correction unit 416B corrects the raster graphic data so that a small dot is formed at the complementation position when the amount of ink discharged to the complementation position is none (when ink is not discharged, that is, a blank in FIG. 10A) in the raster graphic data generated in step S200, that is, when "none" is displayed in the column before complementation in FIG. 11.

In addition, the data correction unit 416B corrects the raster graphic data so that a medium dot is formed at the complementation position when the amount of ink discharged to the complementation position is the amount of ink for forming a small dot ("small" in FIG. 10A) in the raster graphic data generated in step S200, that is, when "small dot" is displayed in the column before complementation in FIG. 11.

Similarly, the data correction unit 416B corrects the raster graphic data so that a large dot is formed at the complementation position when the amount of ink discharged to the complementation position is the amount of ink for forming a medium dot ("medium" in FIG. 10A) in the raster graphic data generated in step S200, that is, when "medium dot" is displayed in the column before complementation in FIG. 11.

In the above manner, the data correction unit 416B increases the amount of ink for one discharge when the size of a dot at the complementation position is none (not forming a dot), small, or medium in the raster graphic data generated in step S200.

Meanwhile, the data correction unit 416B does not increase the amount of ink discharged at once anymore when the amount of ink discharged to the complementation position is the amount of ink for forming a large dot ("large" in FIG. 10A) in the raster graphic data generated in step S200, that is, when "large dot" is displayed in the column before complementation in FIG. 11. Accordingly, the data correction unit 416B corrects the raster graphic data so that two large dots are formed at the complementation position (double hit). Therefore, the amount of ink discharged is increased even when the amount of ink discharged is not increased at once anymore.

FIG. 10B illustrates the result of correction of the raster graphic data. The dot position hatched with inclined lines (discharge failure position) in FIG. 10A is associated with "none" in FIG. 10B (blank). The blank complementation position in FIG. 10A is associated with a small dot in FIG. 10B (the position hatched with horizontal lines). The complementation position associated with a small dot in FIG. 10A is associated with a medium dot in FIG. 10B. The complementation position associated with a medium dot in FIG. 10A is associated with a large dot in FIG. 10B. The complementation position associated with a large dot in FIG. 10A is associated with the double hit in FIG. 10B.

In the above manner, correcting information (for example, discharge failure of ink, discharge of ink, and the amount of ink discharged) related to discharge of ink that is associated with the dot position in step S200 associates the same dot position with new information related to discharge of ink in the present step (step S204).

The data correction unit 416B regards data that indicates the dot position and the size of a dot as the dot data after the halftone process in the data after correction illustrated in FIG. 10B and regenerates the raster graphic data in the same manner as that in step S200. Accordingly, the raster graphic data is corrected.

FIG. 5 is referred to again for description here. The printing control unit 417 performs printing by discharging ink to the printing medium 100 from each nozzle included in the printing head 34 using the raster graphic data corrected in step S108 (step S110). The raster graphic data corrected in step S108 is output to the printing apparatus 1 in step S110 when the control unit 40 is provided as the printer driver that is installed on an apparatus (a PC or the like) connected to the printing apparatus 1.

Ink needs to be discharged twice continuously at the complementation position associated with the double hit in the corrected raster graphic data. Accordingly, the printing control unit 417 forms a dot at the continuous dot positions using any method of the following two methods.

A first method is a method of increasing the frequency of discharge of ink. When discharging ink continuously, the printing control unit 417 discharges ink at an interval that is half of an interval in discharging ink not continuously. Accordingly, printing can be performed without decrease in speed.

A second method is a method of decreasing the speed of the carriage. When discharging ink continuously, the printing control unit 417 moves the carriage 32 in the main-scanning direction at a speed that is half of a speed of movement of the carriage 32 in the main-scanning direction in discharging ink not continuously. Accordingly, dots can be stably formed continuously at the adjacent dot positions by using the same nozzle.

According to the first embodiment, the size of a dot that is supposed to be originally formed at the complementation position is considered when a blank formed by a nozzle in which abnormality occurs in the discharge state of ink is complemented through a complementation process around the blank. The amount of ink discharged is increased at once when the size of a dot that is supposed to be originally formed at the complementation position is none, small, or medium. The amount of ink discharged is increased by the double hit of ink when the size of a dot that is supposed to be originally formed at the complementation position is large.

The complementation process cannot be performed, for example, in a case where the size of a dot that is supposed to be originally formed at the complementation position is not considered because the amount of discharge cannot be further increased when the size of a dot that is supposed to be originally formed at the complementation position is the greatest.

On the contrary, according to the first embodiment, the complementation process can be performed independently of the size of an original dot at the complementation position since the process changes for each size of a dot that is supposed to be originally formed at the complementation position. Consequently, decrease in image quality due to discharge failure can be prevented.

Although the positions (positions up and down of the discharge failure position in FIGS. 10A, 10B, and the like) between which the discharge failure position is interposed along the sub-scanning direction are specified as the complementation position in the first embodiment, the complementation position is not limited to these provided that the complementation position is the positions that are adjacent to the discharge failure position along the sub-scanning direction or the positions that are adjacent to the discharge failure position along the main-scanning direction. For example, the number of the complementation position may be one, not two. That is, the complementation position may be only the position that is adjacent to the discharge failure position in the sub-scanning direction (the position up or down the discharge failure position in FIGS. 10A, 10B, and the like) or may be only the position that is adjacent to the discharge failure position in the main-scanning direction (left or right position of the discharge failure position in FIGS. 10A, 10B, and the like). In addition, the complementation position, for example, may be the positions between which the discharge failure position is interposed along the main-scanning direction (left and right positions of the discharge failure position in FIGS. 10A, 10B, and the like). In addition, the complementation position, for example, may be the positions between which the discharge failure position is interposed along the sub-scanning direction and the main-scanning direction (left and right positions of the discharge failure position and positions up and down of the discharge failure position in FIGS. 10A, 10B, and the like).

However, to increase the image quality, it is desirable for the complementation position to be the positions between which the discharge failure position is interposed in the sub-scanning direction (positions up and down of the discharge failure position in FIGS. 10A, 10B, and the like) rather than the positions that are just adjacent to the discharge failure position. In addition, it is desirable for the complementation position to be the positions between which the discharge failure position is interposed along the main-scanning direction (left and right positions of the discharge failure position in FIGS. 10A, 10B, and the like) rather than the positions between which the discharge failure position is interposed in the sub-scanning direction. A dot formed by discharge of ink tends to have a horizontally (in the main-scanning direction) long ellipse shape. Particularly, when ink is discharged multiple times, the shape of a dot is likely to be particularly a horizontally long ellipse because the position of the discharge of ink is displaced in the horizontal direction (main-scanning direction) by movement of the carriage. For this reason, a blank at the discharge failure position is likely to be covered by a dot having a horizontally long ellipse shape formed at the complementation position when the discharge failure position is positioned at the left and the right of the complementation position.

The data correction unit 416B corrects the raster graphic data so that ink is not discharged to the discharge failure position in the first embodiment, but this correction is not necessarily needed. However, considering a case where the accuracy of discharge of ink is low (for example, a minute amount of ink is discharged) or any such a case, it is desirable for the data correction unit 416B to correct the raster graphic data so that ink is not discharged to the discharge failure position.

Second Embodiment

The size of a dot after complementation is determined in light of the size of a dot originally formed at the complementation position in the first embodiment of the invention. However, a method for determining the size of a dot at the complementation position is not limited to this.

The second embodiment of the invention is an embodiment of determining the size of a dot after complementation in light of the size of a dot originally formed at the discharge failure position besides the complementation position. Hereinafter, a printing apparatus 2 of the second embodiment will be described. The configuration of the printing apparatus 2 will not be described, and only a featured process performed by the printing apparatus 2 will be described because the printing apparatus 2 in the second embodiment has the same configuration as the printing apparatus 1 in the first embodiment. In addition, the same parts as those in the first embodiment are given the same reference signs and will not be described in the description of the process.

Figure 12:
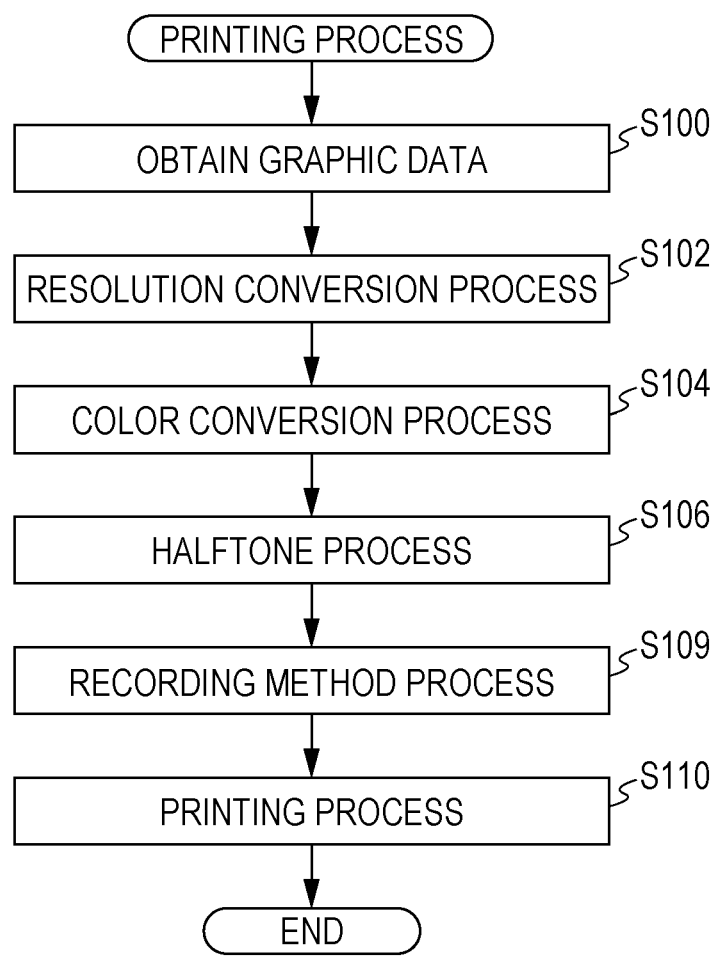
FIG. 12 is a flowchart illustrating a flow of a printing process performed by a printing apparatus in a second embodiment.

FIG. 12 is a flowchart illustrating a flow of a printing process performed by the printing apparatus 2. This process is performed by inputting a printing start instruction via a button or the like.

When the printing process is started, the graphic data obtainment unit 411 obtains the graphic data from the memory card 44 and the like (step S100). The resolution conversion process unit 412 converts the resolution of the graphic data obtained in step S100 into the printing resolution (step S102). The color conversion process unit 413 converts the graphic data of the RGB color space of which the resolution is converted in step S102 into graphic data of the KCMY color space (step S104). The halftone process unit 414 performs the halftone process on the multilevel gradation data converted in color in step S104 (step S106).

Thereafter, the recording method process unit 416 performs a recording method process (step S109). The recording method process in the present embodiment is a process of generating the printing data on the basis of the graphic data and then correcting the printing data on the basis of the position of a discharge-failing nozzle obtained by the nozzle information obtainment unit 415. Hereinafter, the recording method process (step S109) will be described in detail with reference to FIG. 13.

Figure 13:
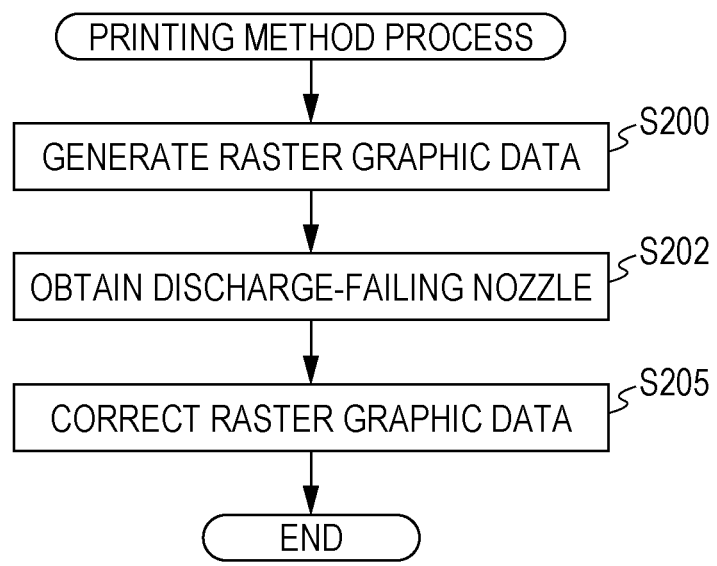
FIG. 13 is a flowchart illustrating a flow of a recording method process performed by the printing apparatus.

FIG. 13 is a flowchart illustrating a flow of the recording method process (step S109).

The data generation unit 416A determines which nozzle discharges ink to form a dot on the printing medium for each dot in the dot data after the halftone process and generates raster graphic data (step S200). The data correction unit 416B obtains the position of a discharge-failing nozzle from the nozzle information obtainment unit 415 (step S202).

Then, the data correction unit 416B corrects the raster graphic data generated in step S200 so that the amount of ink discharged to the complementation position is increased on the basis of the position of a discharge-failing nozzle obtained in step S202 (step S205). Hereinafter, this process will be described with reference to FIGS. 14A and 14B.

Figure 14A:
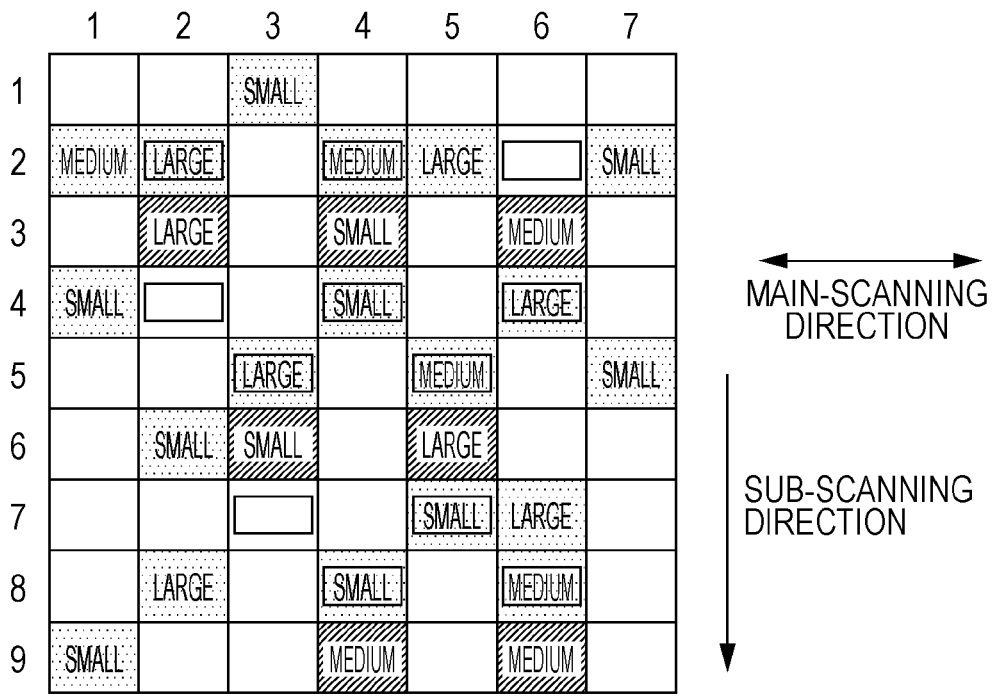
FIG. 14A is raster graphic data before correction.
Figure 14B:
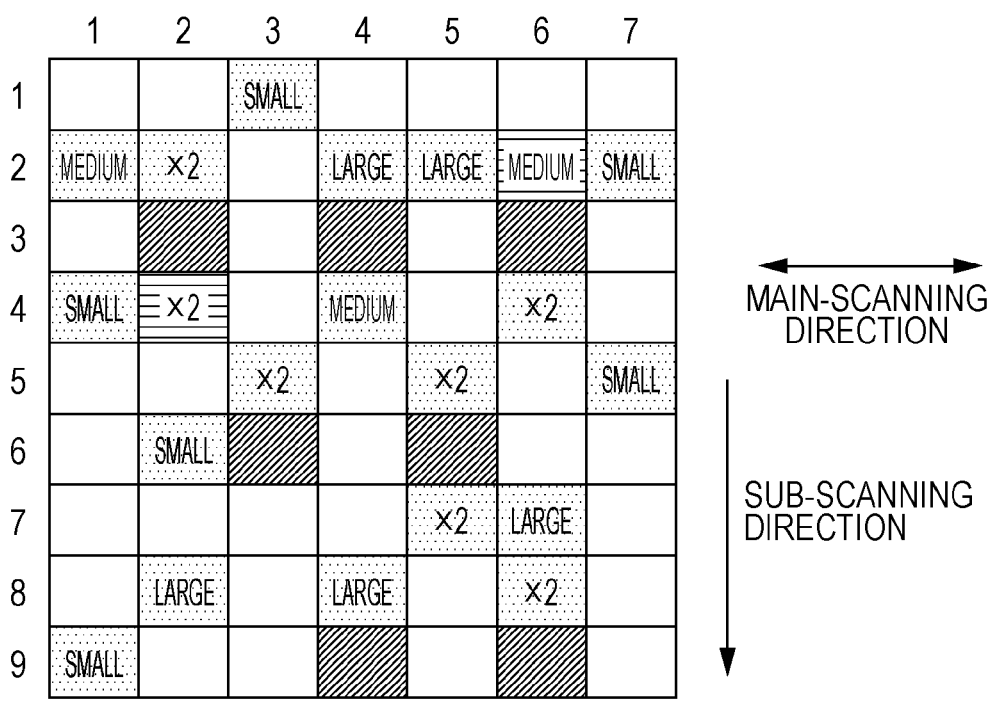
FIG. 14B is raster graphic data after correction.

FIG. 14A is a diagram illustrating the relationship between the dot position and the size of a dot in the raster graphic data before correction (generated in step S200), and FIG. 14B is a diagram illustrating the relationship between the dot position and the size of a dot after correction. FIG. 14A is the same as FIG. 10A.

First, the data correction unit 416B specifies the discharge failure position in the raster graphic data generated in step S200 and corrects the raster graphic data so that the amount of ink discharged to the discharge failure position is "none" like in the first embodiment.

Next, the data correction unit 416B specifies the positions (positions up and down of the position hatched with the inclined lines in FIG. 14A) between which the discharge failure position (position hatched with the inclined lines in FIG. 14A) is interposed along the transport direction (sub-scanning direction) as the complementation position like in the first embodiment.

Then, the data correction unit 416B determines the amount of ink discharged to the complementation position using the complementation table 433B (refer to FIG. 15). Terms used in FIG. 15 mean the same as those in FIG. 11 and thus will not be described.

In the second embodiment, the size of a dot after complementation is determined in light of the size of a dot originally formed at the discharge failure position and the size of a dot originally formed at the complementation position as illustrated in FIG. 15.

First, a case of not forming a dot at the discharge failure position ("none" is displayed in the missing pixel column in FIG. 15) will be described. In this case, the data correction unit 416B does not correct the raster graphic data.

Next, a case of forming a small dot at the discharge failure position ("small dot" is displayed in the missing pixel column in FIG. 15) will be described.

The data correction unit 416B corrects the raster graphic data so that a small dot is formed at the complementation position when the amount of ink discharged to the complementation position is none (when ink is not discharged, that is, a blank in FIG. 14A) in the raster graphic data generated in step S200, that is, when "none" is displayed in the column before complementation in FIG. 15.

In addition, the data correction unit 416B corrects the raster graphic data so that a medium dot is formed at the complementation position when the amount of ink discharged to the complementation position is the amount of ink for forming a small dot ("small" in FIG. 14A) in the raster graphic data generated in step S200, that is, when "small dot" is displayed in the column before complementation in FIG. 15. Similarly, the data correction unit 416B corrects the raster graphic data so that a large dot is formed at the complementation position when the amount of ink discharged to the complementation position is the amount of ink for forming a medium dot ("medium" in FIG. 14A) in the raster graphic data generated in step S200, that is, when "medium dot" is displayed in the column before complementation in FIG. 15. This process is the same as that in the first embodiment.

The data correction unit 416B corrects the raster graphic data so that ink double hits the complementation position when the amount of ink discharged to the complementation position is the amount of ink for forming a large dot ("large" in FIG. 14A) in the raster graphic data generated in step S200, that is, when "large dot" is displayed in the column before complementation in FIG. 15.

In addition, in the case of the double hit of ink, the data correction unit 416B determines the amount of ink so that the total amount of ink discharged by the double hit is the sum of the amount of ink discharged to the discharge failure position and the amount of ink discharged to the complementation position in the raster graphic data generated in step S200. Here, the data correction unit 416B determines the amount of ink discharged by the double hit to be 16 ng since the amount of ink discharged to the discharge failure position is the amount of ink for a small dot (4 ng here), and the amount of ink discharged to the complementation position is the amount of ink for a large dot (12 ng here).

Next, a case of forming a medium dot at the discharge failure position ("medium dot" is displayed in the missing pixel column in FIG. 15) will be described.

The data correction unit 416B corrects the raster graphic data so that a medium dot is formed at the complementation position when the amount of ink discharged to the complementation position is none (when ink is not discharged, that is, a blank in FIG. 14A) in the raster graphic data generated in step S200, that is, when "none" is displayed in the column before complementation in FIG. 15.

In addition, the data correction unit 416B corrects the raster graphic data so that a large dot is formed at the complementation position when the amount of ink discharged to the complementation position is the amount of ink for forming a small dot ("small" in FIG. 14A) in the raster graphic data generated in step S200, that is, when "small dot" is displayed in the column before complementation in FIG. 15.

The data correction unit 416B corrects the raster graphic data so that ink double hits the complementation position when the amount of ink discharged to the complementation position is the amount of ink for forming a medium dot or a large dot ("medium" or "large" in FIG. 14A) in the raster graphic data generated in step S200, that is, when "medium dot" or "large dot" is displayed in the column before complementation in FIG. 15. In addition, the data correction unit 416B determines the amount of ink so that the total amount of ink discharged by the double hit is the sum of the amount of ink discharged to the discharge failure position and the amount of ink discharged to the complementation position in the raster graphic data generated in step S200.

Last, a case of forming a large dot at the discharge failure position ("large dot" is displayed in the missing pixel column in FIG. 15) will be described.

The data correction unit 416B corrects the raster graphic data so that a large dot is formed at the complementation position when the amount of ink discharged to the complementation position is none (when ink is not discharged, that is, a blank in FIG. 14A) in the raster graphic data generated in step S200, that is, when "none" is displayed in the column before complementation in FIG. 15.

The data correction unit 416B corrects the raster graphic data so that ink double hits the complementation position when the amount of ink discharged to the complementation position is the amount of ink for forming a small dot, a medium dot, or a large dot ("small", "medium", or "large" in FIG. 14A) in the raster graphic data generated in step S200, that is, when "small dot", "medium dot", or "large dot" is displayed in the column before complementation in FIG. 15. In addition, the data correction unit 416B determines the amount of ink so that the total amount of ink discharged by the double hit is the sum of the amount of ink discharged to the discharge failure position and the amount of ink discharged to the complementation position in the raster graphic data generated in step S200.

To summarize, the data correction unit 416B corrects the raster graphic data so that the amount of ink discharged to the complementation position after correction is the sum of the amount of ink discharged to the discharge failure position and the amount of ink discharged to the complementation position in the raster graphic data generated in step S200. In this case, ink is discharged at once when the amount of ink discharged to the complementation position after correction is the mass of ink stored in the ROM 43 (4 ng for a small dot, 8 ng for a medium dot, and 12 ng for a large dot). On the contrary, ink is discharged by the double hit when the amount of ink discharged to the complementation position after correction is greater than the greatest amount of ink stored in the ROM 43 (12 ng here).

In addition, the data correction unit 416B determines the amount of ink discharged for each time of the double hit to be a combination of the mass of ink (4 ng for a small dot, 8 ng for a medium dot, and 12 ng for a large dot) stored in the ROM 43 when correcting the raster graphic data so that ink is discharged by the double hit. For example, when the total amount of ink discharged is 16 ng, the data correction unit 416B may set ink to be discharged by 8 ng twice or may set ink to be discharged by 4 ng once and 12 ng once. However, the amount of ink discharged for each time of the double hit is not necessarily needed to be the combination of the mass of ink stored in the ROM 43. For example, when the total amount of ink discharged is 16 ng, ink may be discharged by 10 ng once and 6 ng once.

The data correction unit 416B corrects the raster graphic data so that the amount of ink discharged for each time of the double hit determined in the above manner is also associated with each dot position when ink is discharged at the complementation position by the double hit.

FIG. 14B illustrates the result of correction of the raster graphic data. The dot position hatched with inclined lines (discharge failure position) in FIG. 14A is associated with "none" in FIG. 14B (blank). The amount of ink discharged that is determined on the basis of the amount of ink discharged which is associated with the discharge failure position and the complementation position in FIG. 14A is associated with the dot position (complementation position) illustrated with a double-lined box in FIG. 14A. Associations related to the amount of ink when discharged by the double hit are omitted in FIG. 14B.

The data correction unit 416B regards data that indicates the dot position and the size of a dot as the dot data after the halftone process in the data after correction illustrated in FIG. 14B and regenerates the raster graphic data in the same manner as that in step S200. Accordingly, the raster graphic data is corrected.

FIG. 12 is referred to again for description here. The printing control unit 417 performs printing by discharging ink to the printing medium 100 from each nozzle included in the printing head 34 using the raster graphic data corrected in step S108 (step S110).

According to the second embodiment, the amount of ink (the size of a dot) discharged to the complementation position is determined on the basis of the size of a dot (the amount of ink discharged) that is supposed to be originally formed at the discharge failure position and the complementation position when a blank formed by a nozzle in which abnormality occurs in the discharge state of ink is complemented through the complementation process around the blank. In addition, according to the second embodiment, the amount of ink discharged to the complementation position is determined to be the sum of the amount of ink discharged for dots that are supposed to be originally formed at the discharge failure position and the complementation position. Accordingly, the complementation process can be performed with high image quality appropriately for an image formed.

Although ink is discharged at once when the amount of ink discharged to the complementation position after correction is the mass of ink stored in the ROM 43, and ink is discharged by the double hit when the amount of ink is greater than the greatest amount of ink stored in the ROM 43 in the second embodiment, these do not limit a case where ink is discharged multiple times.

FIG. 16 is an example of a complementation table 433C according to a modification example. The data correction unit 416B corrects the raster graphic data so that a small dot is discharged twice to the complementation on the basis of the complementation table illustrated in FIG. 16 when, for example, a small dot (4 ng here) is supposed to be formed at the discharge failure position, and a small dot is supposed to be formed at the complementation position. Even in this case, the amount of ink discharged to the complementation position is determined to be the sum of the amount of ink discharged for dots that are supposed to be originally formed at the discharge failure position and the complementation position like in the case of the complementation table 433B.

Although ink is discharged twice at most when discharging ink multiple times in the second embodiment, the number of discharge of ink may be further increased when the amount of ink is great. For example, the amount of ink discharged to the complementation position after correction becomes 24 ng when a large dot (12 ng here) is supposed to be formed at the discharge failure position, and a large dot is supposed to be formed at the complementation position. The data correction unit 416B corrects the raster graphic data so that a large dot is discharged twice in the second embodiment but may correct the raster graphic data so that a medium dot (8 ng here) is discharged three times. Increasing the number of discharge of ink allows a further great amount of ink to be discharged.

When discharging ink three times or more, it is desirable that the speed of the carriage be decreased for discharging ink to prevent the granularity of ink from deteriorating due to discharged ink being horizontally expanded.

Although a serial printer is exemplified in the first embodiment and the second embodiment, the invention can be also applied to a line printer not limited to the serial printer. In the case of the serial printer, the invention can be also applied to a multi-head type that is configured with a plurality of heads. In addition, in the case of the line printer, the invention can be also applied to a case where the line printer is configured with one head and can be also applied to a case of a multi-head type line printer configured with a plurality of heads.

Although printing is performed by using the OL printing in the first embodiment and the second embodiment, the invention can be also applied to so-called band printing and can be also applied to so-called interlaced printing, all of which are a printing method of lining up images printed in one pass in the transport direction. In the band printing, rasters in a certain pass are not printed between rasters printed in another pass. In the interlaced printing, rasters in a certain pass are printed between rasters printed in another pass. In the cases other than the OL printing, the complementation position is the positions that are adjacent to the discharge failure position along the sub-scanning direction.

Hereinbefore, the invention is described by using the embodiments, but the technical range of the invention is not limited to the range described in the above embodiments. It is apparent for those skilled in the related art that various modifications or improvements can be made to the embodiments described above. In addition, it is apparent from the appended claims that embodiments with such modifications or improvements can be included in the technical range of the invention. Furthermore, the invention can be also embodied by combining a plurality of embodiments.

Particularly, the invention may be provided as an apparatus such as the printing apparatus in which a printing control device is disposed or may be provided as the printing control device. In addition, the invention can be provided as a program that controls the printing control device and the like or as a recording medium in which the program is stored.

What is claimed is:

1. A printing control device comprising:
a nozzle information obtainment unit that obtains the position of a discharge-failing nozzle which fails to discharge ink in a printing head which includes a plurality of nozzles discharging ink on a printing medium;
a data generation unit that generates printing data in which a dot position which is the position of a dot constituting an image printed on the printing medium is associated with an amount of ink to be discharged to the dot position; and
a data correction unit that specifies a second position which is adjacent to a first position where ink is to be discharged by the discharge-failing nozzle in the printing data on the basis of the position of the discharge-failing nozzle obtained and corrects the printing data so that the amount of ink discharged at the second position in the corrected printing data is increased; and
a storage unit in which a relationship between the size of a plurality of dots and amount of ink to be discharged in association with each size of the plurality of dots are stored,
wherein the data correction unit associates multiple times of discharging ink with the second position when the amount of ink discharged to the second position is greater than the amount of ink corresponding to a largest size of a dot among the size of the plurality of dots stored in the storage unit;
wherein a first amount, a second amount that is greater than the first amount, and a third amount that is greater than the second amount are stored in the storage unit as the amount of ink discharged, and
the data correction unit corrects the printing data so that the first amount is associated with the second position when the amount of ink associated with the second position in the printing data generated is none, the second amount is associated with the second position when the amount of ink associated with the second position in the printing data generated is the first amount, the third amount is associated with the second position when the amount of ink associated with the second position in the printing data generated is the second amount, and a fourth amount consist of two times of discharge of ink that is greater than the third amount are associated with the second position when the amount of ink associated with the second position in the printing data generated is the third amount.

2. The printing control device according to claim 1, wherein the data correction unit specifies positions between which the first position is interposed along a transport direction of the printing medium as the second position.

3. The printing control device according to claim 1, wherein the data correction unit
does not correct the printing data generated when the amount of ink associated with the first position in the printing data generated is none, and
corrects the printing data so that a sum of the amount of ink associated with the first position in the printing data generated and the amount of ink associated with the second position in the printing data generated is associated with the second position when discharge of ink is associated with the first position in the printing data generated.

4. The printing control device according to claim 1, wherein a first amount, a second amount that is greater than the first amount, and a third amount that is greater than the second amount are stored in the storage unit as the amount of ink discharged, and
the data correction unit
corrects the printing data so that the second amount is associated with the second position when the amount of ink associated with the second position in the printing data generated is the first amount, the third amount is associated with the second position when the amount of ink associated with the second position in the printing data generated is the second amount, and the fourth amount and two times of discharge of ink are associated with the second position when the amount of ink associated with the second position in the printing data generated is the third amount in a case where the amount of ink associated with the first position in the printing data generated is the first amount,
associates the third amount with the second position when the amount of ink associated with the second position in the printing data generated is the first amount and associates the fourth amount and two times of discharge of ink with the second position when the amount of ink associated with the second position in the printing data generated is the second amount or the third amount in a case where the amount of ink associated with the first position in the printing data generated is the second amount, and
associates the fourth amount and two times of discharge of ink with the second position when the amount of ink associated with the second position in the printing data generated is the first amount, the second amount, or the third amount in a case where the amount of ink associated with the first position in the printing data generated is the third amount.

5. The printing control device according to claim 1, wherein the data correction unit corrects the printing data so that ink is discharged multiple times to the second position.

6. A printing control method comprising:
generating printing data in which a dot position which is the position of a dot constituting an image printed on a printing medium is associated with the amount of ink discharged to the dot position;
storing a relationship between the size of a plurality of dots and amount of ink to be discharged in association with each size of the plurality of dots in a storage unit; and
specifying a second position that is adjacent to a first position where ink is to be discharged by a discharge-failing nozzle in the printing data on the basis of the position of the discharge-failing nozzle that fails to discharge ink in a printing head which includes a plurality of nozzles discharging ink to the printing medium and correcting the printing data so that the amount of ink discharged at the second position in the corrected printing data is increased, and
associating multiple times of discharging ink with the second position when the amount of ink discharged to the second position is greater than the amount of ink corresponding to a largest size of a dot among the size of the plurality of dots stored in the storage unit;
wherein a first amount, a second amount that is greater than the first amount, and a third amount that is greater than the second amount are stored in the storage unit as the amount of ink discharged, and
the data correction unit corrects the printing data so that the first amount is associated with the second position when the amount of ink associated with the second position in the printing data generated is none, the second amount is associated with the second position when the amount of ink associated with the second position in the printing data generated is the first amount, the third amount is associated with the second position when the amount of ink associated with the second position in the printing data generated is the second amount, and a fourth amount consist of two times of discharge of ink that is greater than the third amount are associated with the second position when the amount of ink associated with the second position in the printing data generated is the third amount.

7. A non-transitory computer readable storage medium storing computer program, the program causing a computer to function as a printing control device and to execute:
generating printing data in which a dot position which is the position of a dot constituting an image printed on a printing medium is associated with the amount of ink discharged to the dot position; and
specifying a second position that is adjacent to a first position where ink is discharged by a discharge-failing nozzle in the printing data on the basis of the position of the discharge-failing nozzle that fails to discharge ink in a printing head which includes a plurality of nozzles discharging ink to the printing medium and correcting the printing data so that the amount of ink which is greater than the amount of ink associated with the second position in the printing data generated is associated with the second position.

* * * * *